(12) United States Patent
     Schwaiger

(10) Patent No.: US 12,083,819 B2
(45) Date of Patent: Sep. 10, 2024

(54) OMNIDIRECTIONAL WHEEL HUB DRIVE

(71) Applicant: AMX AUTOMATION TECHNOLOGIES GMBH, Linz (AT)

(72) Inventor: Meinhard Schwaiger, Linz (AT)

(73) Assignee: AGILOX SYSTEMS GMBH, Neukirchen bei Lambach (AT)

( * ) Notice: Subject to any disclaimer, the term of this patent is extended or adjusted under 35 U.S.C. 154(b) by 356 days.

(21) Appl. No.: 17/617,554

(22) PCT Filed: Jun. 8, 2020

(86) PCT No.: PCT/AT2020/060231
     § 371 (c)(1),
     (2) Date: Dec. 8, 2021

(87) PCT Pub. No.: WO2020/247991
     PCT Pub. Date: Dec. 17, 2020

(65) Prior Publication Data
     US 2022/0227168 A1    Jul. 21, 2022

(30) Foreign Application Priority Data
     Jun. 8, 2019   (AT) .............................. A 60145/2019

(51) Int. Cl.
     *B60B 19/00*     (2006.01)
     *B60B 27/00*     (2006.01)
(52) U.S. Cl.
     CPC ........ *B60B 19/003* (2013.01); *B60B 27/0015* (2013.01); *B60B 27/0052* (2013.01); *B60B 27/0063* (2013.01)

(58) Field of Classification Search
     CPC .............. B60B 19/003; B60B 27/0015; B60B 27/0052; B60B 27/0063; B60L 2220/44; B60K 7/0007; B60K 7/00
     See application file for complete search history.

(56) References Cited

U.S. PATENT DOCUMENTS

| 2,506,146 | A  | 5/1950 | Gladish    |
|-----------|----|--------|------------|
| 4,221,273 | A  | 9/1980 | Finden     |
| 4,529,052 | A  | 7/1985 | Imai et al.|
| 6,540,039 | B1 | 4/2003 | Yu et al.  |

(Continued)

FOREIGN PATENT DOCUMENTS

| AT | 519463 B1   | 7/2018 |
|----|-------------|--------|
| CN | 101224701 A | 7/2008 |

(Continued)

*Primary Examiner* — John D Walters
(74) *Attorney, Agent, or Firm* — Dykema Gossett PLLC

(57) ABSTRACT

Aspects of the present disclosure are directed to, for example, drive systems for transport devices. In one example embodiment, a drive system is disclosed including at least two drive wheels, at least one wheel bearing, at least one rim of the at least one of the drive wheels mounted by means of the at least one wheel bearing, at least one drive of the at least one of the drive wheels is arranged within the at least one wheel bearing, and at least one braking device coupled to at least one of the drive wheels. The at least two drive wheels are aligned on a common first axis, the drive wheel axis of rotation, which is angled relative to a second axis, the pendulum axis, and a third axis, a pivot axis, is likewise arranged at an angle relative to the first and second axes.

19 Claims, 7 Drawing Sheets

(56) References Cited

U.S. PATENT DOCUMENTS

| | | | |
|---|---|---|---|
| 6,581,703 B2* | 6/2003 | Hammonds | B62D 11/06 |
| | | | 180/6.2 |
| 6,830,114 B2* | 12/2004 | Hammonds | B66F 9/07545 |
| | | | 180/6.2 |
| 7,528,518 B2* | 5/2009 | Maeda | H02K 9/06 |
| | | | 310/67 R |
| 7,694,758 B1 | 4/2010 | Hammonds | |
| 7,789,175 B2* | 9/2010 | Tobey | B60B 27/0021 |
| | | | 180/6.48 |
| 8,348,002 B2* | 1/2013 | Checketts | B62D 5/0418 |
| | | | 180/234 |
| 9,331,546 B2* | 5/2016 | Kim | H02K 7/14 |
| 2002/0014357 A1 | 2/2002 | Hammonds | |
| 2003/0127255 A1 | 7/2003 | Hammonds | |
| 2004/0079560 A1 | 4/2004 | Hammonds | |
| 2007/0080000 A1 | 4/2007 | Tobey et al. | |
| 2011/0168474 A1 | 7/2011 | Checketts et al. | |
| 2014/0015382 A1 | 1/2014 | Kim | |

FOREIGN PATENT DOCUMENTS

| | | |
|---|---|---|
| CN | 102007676 A | 4/2011 |
| CN | 102673380 A | 9/2012 |
| CN | 105691103 A | 6/2016 |
| CN | 106357051 A | 1/2017 |
| CN | 106364310 A | 2/2017 |
| CN | 108768018 A | 11/2018 |
| DE | 102006040220 A1 | 3/2008 |
| DE | 102008019974 A1 | 11/2009 |
| DE | 102010049622 A1 | 6/2011 |
| DE | 202011108560 U1 | 3/2013 |
| DE | 102013202592 A1 | 8/2014 |
| DE | 102013019726 A1 | 5/2015 |
| DE | 202014000755 U1 | 5/2015 |
| DE | 102016103808 A1 | 9/2016 |
| DE | 102017104684 A1 | 9/2017 |
| DE | 102016008150 A1 | 1/2018 |
| DE | 102017006888 A1 | 3/2018 |
| EP | 2805832 B1 | 6/2017 |
| EP | 3261237 A1 | 12/2017 |
| JP | S62283072 A | 12/1987 |
| WO | 9622895 A1 | 8/1996 |
| WO | 2010073802 A2 | 7/2010 |
| WO | 2014079881 A2 | 5/2014 |
| WO | 2015092743 A2 | 6/2015 |
| WO | 2016150427 A1 | 9/2016 |
| WO | 2017122814 A1 | 7/2017 |
| WO | 2018136987 A1 | 8/2018 |

* cited by examiner

OMNIDIRECTIONAL WHEEL HUB DRIVE

CROSS-REFERENCE TO RELATED APPLICATIONS

This application is a national stage filing based upon International application No. PCT/AT2020/060231, filed 8 Jun. 2020, which claims the benefit of priority to Austria application No. A 60145/2019, filed 8 Jun. 2019.

BACKGROUND

The invention relates to a novel drive system for transport devices having two individually electromagnetically driven drive wheels, which are arranged in alignment on a common first axis, which is arranged to oscillate at an angle of 90° to a second axis, to which a third axis is arranged at an angle of 90° as a pivot axis, with drive wheels, the rim of which is mounted by means of the wheel bearing and the electromagnetic drive components are located essentially inside the wheel bearing, so that a load capacity several times higher than conventional arrangements is made possible with comparable dimensions. In a further preferred embodiment, the drive system is designed with a braking device and also with a spring-damping element.

It relates to a drive system for transport devices having at least two preferably individually driven drive wheels which are arranged in alignment on a common first axis, the drive-wheel axis of rotation, which is arranged at an angle to a second axis, the pendulum axis, to which a third axis, the pivot axis, is also arranged at an angle.

From CN 101224701 A, CN 102007676 A, CN 102673380 A, CN 105691103 A, CN 106357051 A, CN106364310 A, DE 10 2006 040 220 A1, DE 10 2008 019 974 A1, DE 10 2010 049 622 A1, DE 10 2013 202 592 A1, DE 10 2016 103 808 A1, DE 10 2017 104 684 A1, EP 2 805 832 B1, EP 3 261 237 A1, U.S. Pat. No. 2,506,146, US 2014/0015382 A1, WO 96/22895 A1, WO 2010/073802 A2, DE 20 2011 108 560 U1, wheel drives of electric vehicles are known, in which an electric drive is integrated within the rim clearance and its torque is transmitted directly or by means of an intermediate gear to the rim of the wheel, the braking torque required for braking is generated by means of the electric motor or additionally by means of an electromagnetically or hydraulically actuated mechanical brake, and the rim of the wheel is mounted on the wheel axle by means of the hub bore. Disadvantages of such electromagnetic wheel drives are, due to the mounting of the rim on the central wheel axle, the design-related small wheel axle diameters, the small bearing dimensions and, as a result, the small transmittable wheel loads in relation to the wheel diameter. Furthermore, there are no sensors for detecting the speed and direction of rotation of the drive units.

From WO 2010/073802 A2, wheel drives of electric vehicles are known, in which the electric drive is directly integrated into the rim bed and the rim bed is mounted by means of roller bearings on a support ring, which carries the wheel suspension and additionally the components of a disk brake required for braking. The disadvantage of such systems is the direct transmission of loads on the wheel from the rim bed to the electromagnetic drive unit as well as the transmission of forces from the wheel suspension to the support ring and the electromagnetic drive unit connected to the support ring. Furthermore, there are no sensors to detect the speed and direction of rotation of the drive units.

From WO 2015/092743 A2, wheel drives of electric vehicles are known, in which the electric drive is integrated in an outer support ring arranged within the rim bed and screwed to the rim bed, and wherein this outer support ring is mounted by means of roller bearings on an inner support ring which carries the wheel suspension and additionally the components of a disk brake required for braking. A disadvantage of such systems is the direct transmission of loads on the wheel from the rim to the outer support ring of the electromagnetic drive unit and the transmission of forces from the wheel suspension to the electromagnetic drive unit connected to the inner support ring. Furthermore, there are no sensors for detecting the speed and direction of rotation of the drive units.

Wheel drives for electric vehicles are known from DE 10 2016 008 150 A1, in which the electric drive is arranged outside the wheel body and inside the vehicle and the torque is transmitted by means of a coupling to a gearbox and further to a shaft which is connected to the wheel. The disadvantage of such systems is the resulting long length of the drive unit, which requires a multiple of the width of the wheel. Furthermore, there are no sensors to detect the speed and direction of rotation of the drive units.

From DE 10 2016 103 808 A1, DE 10 2017 104 684 A1, EP 2 805 832 B1, WO 2016/150427 A1, rims for wheel drives of electric vehicles are known, in which the rim forms part of the electric drive. The disadvantages of such electromagnetic wheel drives are, due to the mounting of the rim on the central wheel axle, the design-related small wheel axle diameters, the small bearing dimensions and, as a result, the small transmittable wheel loads in relation to the wheel diameter. Furthermore, there are no sensors for detecting the speed and direction of rotation of the drive units.

From WO 2014/079881 A2, an electromagnetic drive is known quite generally for generating a torque as a drive for electric vehicles. Disadvantages are the lack of supporting braking devices and of sensors for detecting the speed and direction of rotation of the drive units.

Representative of non-driven wheels with brakes, DE 10 2017 006 888 A1 discloses a monitoring system for an electromagnetically actuatable brake and a vehicle with an electromagnetically actuatable brake. A disadvantage is that the wheel provided for braking does not have a drive, but is designed as a trailing wheel.

Steerable drive units for vehicles are known from JPS 62283072 A, U.S. Pat. Nos. 4,221,273, 7,694,758 B1, US 2002/0014357 A1, US 2003/0127255 A1, US 2004/0079560 A1, in which at least two individually driven wheels are arranged in a common axis of rotation which is perpendicular to the plane of the roadway, and the direction of travel of which is determined by different rotational speeds and directions of rotation of the driven wheels. The disadvantage of these drive units is that no direct surface mobility is possible, but travel movements can only take place along path curves or a change in direction of the drive units can only take place when the vehicle is at a standstill, so that a fluid sequence of movements is not possible.

From DE 10 2013 019 726 A1, omnidirectional drive systems are known which are spaced from the drive-wheel axis of rotation by a pendulum axis, the distance of which is greater than half the drive wheel diameter, and the drive motors are arranged outside the drive wheels and are connected thereto by means of gears. The disadvantages are the overall height, which is increased due to the arrangement of the drive motors, and the pendulum axis, which is arranged at a vertical distance upwards from the axis of rotation of the wheels, so that transverse forces, e.g. as a result of cornering, form a moment consisting of transverse force and vertical distance, which leads to uneven contact of the two drive wheels with the ground.

From DE 20 2014 000 755 U1, an omnidirectional drive system for heavy-duty floor vehicles is known, the wheel sets of which, which are arranged so as to be rotatable vertically about a plane relative to the road surface, comprise two individually driven drive wheels which are each designed with a spring and lifting device as level compensation and have a brake release. The disadvantage is the increase in width and height of the drive unit caused by the spring and lifting device.

From U.S. Pat. No. 6,540,039 B1 an omnidirectional drive system and vehicle configurations are known, wherein the drive unit comprises two individually driven wheels arranged on a common wheel axis, which is connected to a pivot axis arranged at right angles thereto, which is rotatably connected to the vehicle at a distance greater than half the diameter of the drive wheels from the wheel axis. In a further configuration, the pivot axis is connected to the wheel axis in an oscillating manner so that level compensation is possible in the event of uneven ground. The disadvantages of these configurations are that the pivot axis required for the direction of travel is arranged outside the drive unit at a distance greater than half the drive wheel diameter, so that the overall size is unfavorably influenced, and that, if the level compensation function is present, the maneuverability is restricted, since straight-ahead travel and 90° transverse travel are not possible with a vehicle having only two drive units with level compensation, or requires trailing support wheels which are subject to increased wear.

From U.S. Pat. No. 4,529,052 omnidirectional drive units are known which are designed with a level compensating pendulum axis which is arranged in the installation position above the drive wheels at a distance greater than half the drive wheel diameter, and drive unit configurations which are designed with trailing support wheels. Disadvantages are the arrangement of the pivot axis required for the direction of travel above the drive unit at a distance greater than half the drive wheel diameter, so that the overall size is unfavorably influenced and the trailing support wheels are subject to increased wear.

An omnidirectional drive system for vehicles is known from US 2011/0168474 A1, wherein the drive system comprises in each case one wheel which is arranged rotatably in a pivoting device about an axis aligned vertically with respect to the plane of the roadway and this pivoting device is driven by a second drive motor in order to change direction. The disadvantage is that a single wheel with a pivoting device is subject to increased wear and that an additional pivot drive with gear is required for each drive wheel.

U.S. Pat. No. 7,789,175 B2 discloses an omnidirectional drive system for vehicles, the drive wheels of which are connected via a rigid drive-wheel axis of rotation, which is fixed in a rigid housing for accommodating the drive motors, and is designed with a pivot bearing arranged vertically to the roadway plane, the distance of which to the drive-wheel axis is greater than the diameter of the drive wheels. Disadvantages are the enormous overall height and the lack of a pendulum axis to compensate for uneven ground.

An omnidirectional drive system for autonomous driving devices is known from AT 519 463, which is designed with two drive wheels, each driven by an electric motor via an intermediate gear, and having a vertical pivot axis, a pendulum axis arranged at an angle of 90° thereto and a drive-wheel axis arranged at an angle of 90° thereto. A disadvantage is the concept-related small width of the drive wheels and the resulting low load capacity.

It is the object of the invention to define an area-movable, omnidirectional chassis as a drive system for heavy-duty vehicles, which can absorb high loads and impacts in an energy-efficient manner and with comparatively small, compact dimensions, which are absorbed by the drive system in such a way that these forces cannot be transmitted to the electromagnetic drive units, which, with reliable level compensation, ensures uniform ground contact of both drive wheels in every state of movement, in which the electromagnetically generated drive torque is transmitted to the drive wheels without loss, which is designed with a braking system which enables the drive wheels to be blocked when the vehicle is switched off (stationary, out of operation, . . . ), which enables a defined safety braking of each individual wheel in the driving state and which does not impede or influence the wheel drive in normal operation. Compact in the sense of the invention refers to a drive system which, with comparable dimensions, has a load capacity which is about 5 to 10 times higher than that of the prior art. Energy-efficient in the sense of the invention means a drive system in which the electromagnetic drive energy is transmitted loss-free and directly to the drive wheel, without an intermediate gear and without additional bearings, and in which the movement states of the drive wheels are detected by means of sensors and the preset values for the electromagnetic drive units are optimized for the respective movement situation of the vehicle by means of the control system.

SUMMARY OF THE INVENTION

According to the invention, this is solved in that at least one rim of the drive wheels is mounted by means of at least one wheel bearing and at least one drive of at least one of the drive wheels is arranged within the wheel bearing, and in that at least one of the drive wheels is coupled to at least one braking device, in that the braking device is designed as a disk brake, in that the braking device has a first brake pad, a brake disk and a second brake pad, and in that the braking device is designed having a brake cylinder which has a cavity which can be acted upon by the pressure of a braking medium and whose volume can be varied as a result, and in that at least the first brake pad can be moved as a function of the volume of the brake cylinder.

This achieves a well controllable and smooth, stepless braking.

Preferably, according to the invention, a drive system for transport devices is provided with two individually electromagnetically driven drive wheels which are arranged in alignment on a common first axis, the drive-wheel axis of rotation, which is arranged at an angle of 90° to a second axis, the pendulum axis, to which a third axis, the pivot axis, is arranged at an angle of 90°, characterized in that the rim of the drive wheels is mounted by means of the wheel bearing and the electromagnetic drive components rotor and stator are arranged inside the wheel bearing, and in that each of the drive wheels is coupled to a braking device, in that the braking device is designed as a disk brake, in that the braking device comprises a pressure ring, having the brake pad, a brake disk and a further brake pad, in that the braking device is designed with a brake cylinder which is made of an elastic material and has a cavity which can be acted upon by the pressure of a braking medium.

Preferably, each of the two drive wheels of a drive unit is designed with an electromagnetic drive consisting of a rotor and a stator, wherein the rotor is fixed on a shaft rotatably mounted relative to the drive unit and the stator is fixed within a sleeve rigidly connected to the drive unit. The drive wheel is rotatably mounted on the rigid sleeve, so that all forces acting on the drive wheel are transmitted to this sleeve. The drive unit forms a common axis of rotation, also called the drive-wheel axis of rotation, for the two individually and directly driven drive wheels and has a second axis perpendicular to this common axis of rotation with respect thereto, the pendulum axis, which enables the level compensation of the drive unit in the event of unevenness of the ground, and is mounted in a rotating device, the axis of rotation of which is oriented substantially perpendicular to the plane of the roadway. In this respect, it is provided according to the invention that each of the drive wheels is coupled to a braking device, that the braking device is designed as a disk brake, that the braking device comprises a pressure ring, having the brake pad, a brake disk and a further brake pad, that the braking device is designed with a brake cylinder which is made of an elastic material and has a cavity which can be acted upon by the pressure of a braking medium.

Each drive wheel is coupled to a sensor for detecting the speed and direction of rotation, and the drive unit is implemented with a sensor for detecting the direction of travel. In a further particularly preferred embodiment variant, each drive wheel is coupled to a braking device which ensures that the wheels are locked when the vehicle is at a standstill and in the event of a system failure, which enables the braking effect of the electromagnetic drives to be increased if necessary, and which does not generate any braking torques during normal operation and enables the torque to be transmitted unhindered from the electromagnetic drive to the drive wheel.

Preferably, the braking device comprises a pressure ring on which the first brake pad is arranged.

Preferably, it is provided that at least one braking device is provided for each drive wheel.

Preferably, the first axis and the second axis are disposed at an angle of 90° to each other.

Preferably, the brake medium is a liquid, more preferably an oil or a liquid comprising a glycol or glycols.

Preferably, the first axis and the second axis are each at an angle of 90° to the third axis.

Preferably, the drive wheels are electromagnetically drivable, for example by one or more electric machines with rotor and stator as drive, preferably one electric machine per drive wheel.

The pressure ring serves as a support for the first brake pad. The first brake pad and the pressure ring—if present—are movable through the brake cylinder. If the brake cylinder is filled with brake medium, i.e. inflated, expanded or displaced or unfolded in any other way, the volume of the brake cylinder increases and moves the pressure ring in the direction of the brake disk until the first brake pad presses against the brake disk and the latter against the second brake pad and triggers a braking effect. It may also be provided that the second brake pad is equally movable via the brake cylinder or a further brake cylinder. The brake cylinder may be of a resilient material, have a collapsible skirt and/or comprise at least one movable element such as a piston which varies the volume of the cavity depending on the filling quantity.

A part of the jacket of the brake cylinder—preferably the movable part in the case of a movable part—may be connected to the first brake pad and thus, for example, press the brake pad onto the brake disk when the volume of the cavity is increased. Alternatively, this may also happen when the size of the brake disk is reduced.

Preferably, it is provided that the rotor is supported by at least one rotor bearing relative to the wheel carrier. Thus, by double bearing, wheel bearing and rotor bearing can be constructed differently, in order to take up different forces.

Preferably, it is provided that the wheel bearing is designed as a radial bearing and the rotor bearing as an axial bearing or as a combined axial-radial bearing. This means that at least the majority of the weight forces acting radially on the axis of rotation can be absorbed by the wheel bearing, while axial forces, for example in the case of unevenness in the ground or in more complex cornering maneuvers, can be absorbed by the rotor bearing. As a rule, the axial forces are relatively small. In the case of omnidirectional chassis which, as in accordance with the invention, can be inclined via a pendulum axis and pivoted via a pivot axis, the axial forces are disproportionately higher, in particular in the case of more complex driving maneuvers on uneven terrain.

By using a rotor bearing that can support radial loads and a wheel bearing that can support axial loads or axial-radial loads, an embodiment is achieved that can support particularly high loads. Such an embodiment can also navigate on uneven or stony ground with high load weight without overloading the rotor bearings. Here, the wheel bearings take over the occurring axial and radial parts of the forces acting on the wheel, thus protecting the rotor bearings. Such a design is at the same time easy to assemble and compact, which is especially important for storage vehicles for transporting packages such as containers. Such vehicles must be very agile in movement, but at the same time have the smallest possible chassis.

Preferably, the wheel bearing and/or the rotor bearing are designed as roller bearings, for example as needle bearings or as combined radial-axial bearings.

Furthermore, it may be provided that the braking device has a second device which comprises at least one brake plunger and at least one brake spring which pretensions the brake plunger in a closed position in which the brake blocks at least one drive wheel. Thus, the second device can serve as a safety brake which prevents unintentional rolling away or further rolling in the switched-off state or in the event of a system failure. In this respect, it is preferably provided that the brake plunger, in the closed state, rests against the brake disk, and preferably is pressed against the latter and/or fixes the latter in a frictionally locking and/or positive-locking manner. This further saves space and achieves a particularly small but safe design.

Furthermore, it may be provided according to the invention that the braking device generates a braking torque and locks the drive wheels in the event of standstill or system failure.

To achieve an even more compact design, it may be provided that the brake cylinder has a recess through which the brake plunger extends.

Furthermore, it is also advantageous if the brake cylinder is annular and extends around the axis of rotation. This enables a particularly large connection surface to the pressure ring.

Preferably, each drive wheel has a respective rim, and preferably each rim is supported by at least one respective wheel bearing.

BRIEF DESCRIPTION OF THE DRAWING

The invention is explained in more detail below with reference to the figures, which show as follows.

DETAILED DESCRIPTION

Figure 1:
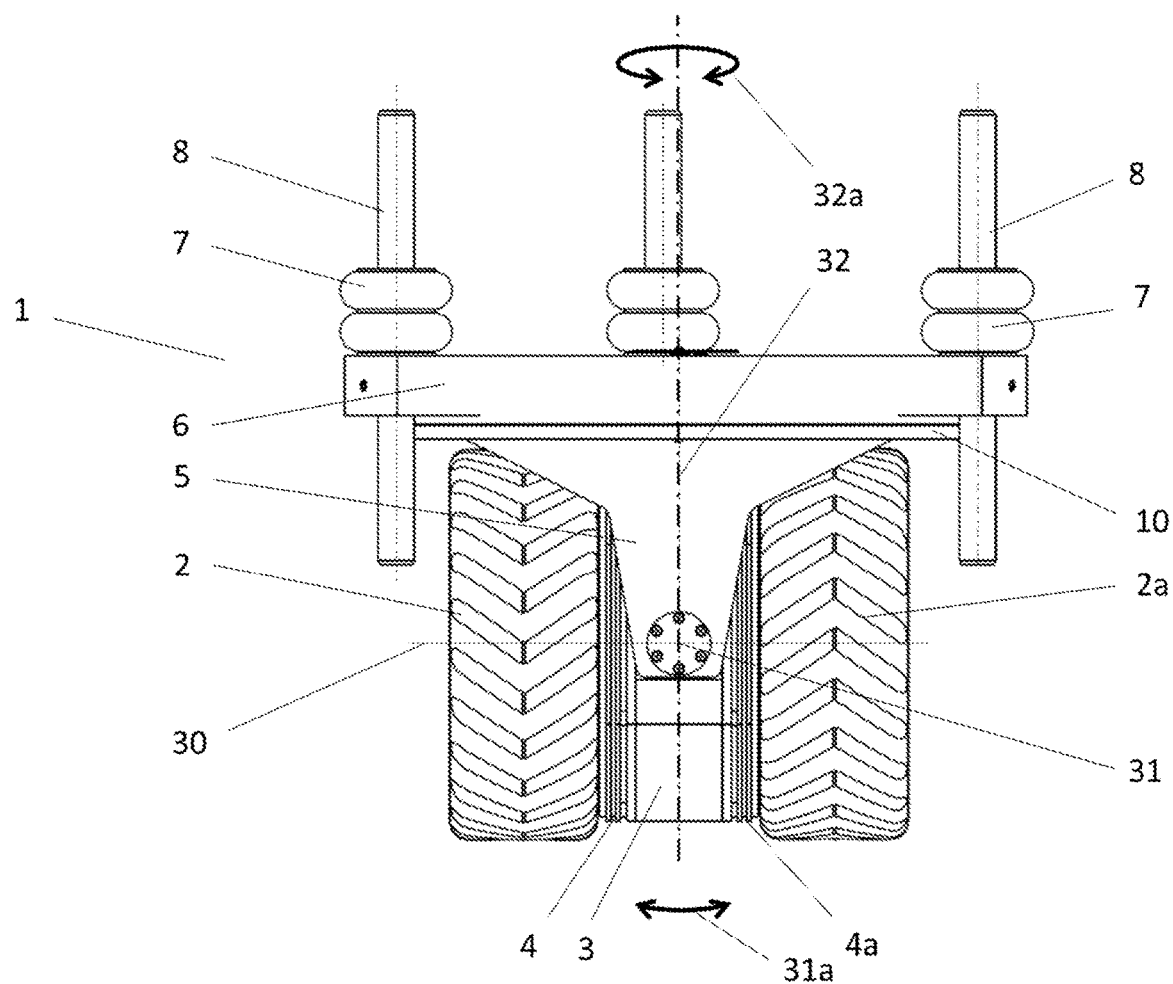
FIG. 1: A drive system according to the invention in front view (direction of travel)

FIG. 1 shows the drive system 1, consisting of the two drive wheels 2 and 2a, the wheel carrier 3, the braking devices 4 and 4a, the rotary pivot part 5, the guide ring 6, the spring damping element 7, the vertical guide 8, the pivot bearing cover 10, the drive-wheel axis of rotation 30, the pendulum axis 31 with the pendulum angle 31a for compensating for unevenness of the ground, wherein the maximum pendulum angle is +/−15°, preferably +/−5°, the pivot axis 32, which can execute a pivoting movement with the pivot angle 32a in the range of +/−360°, preferably +/−180°.

Figure 2:
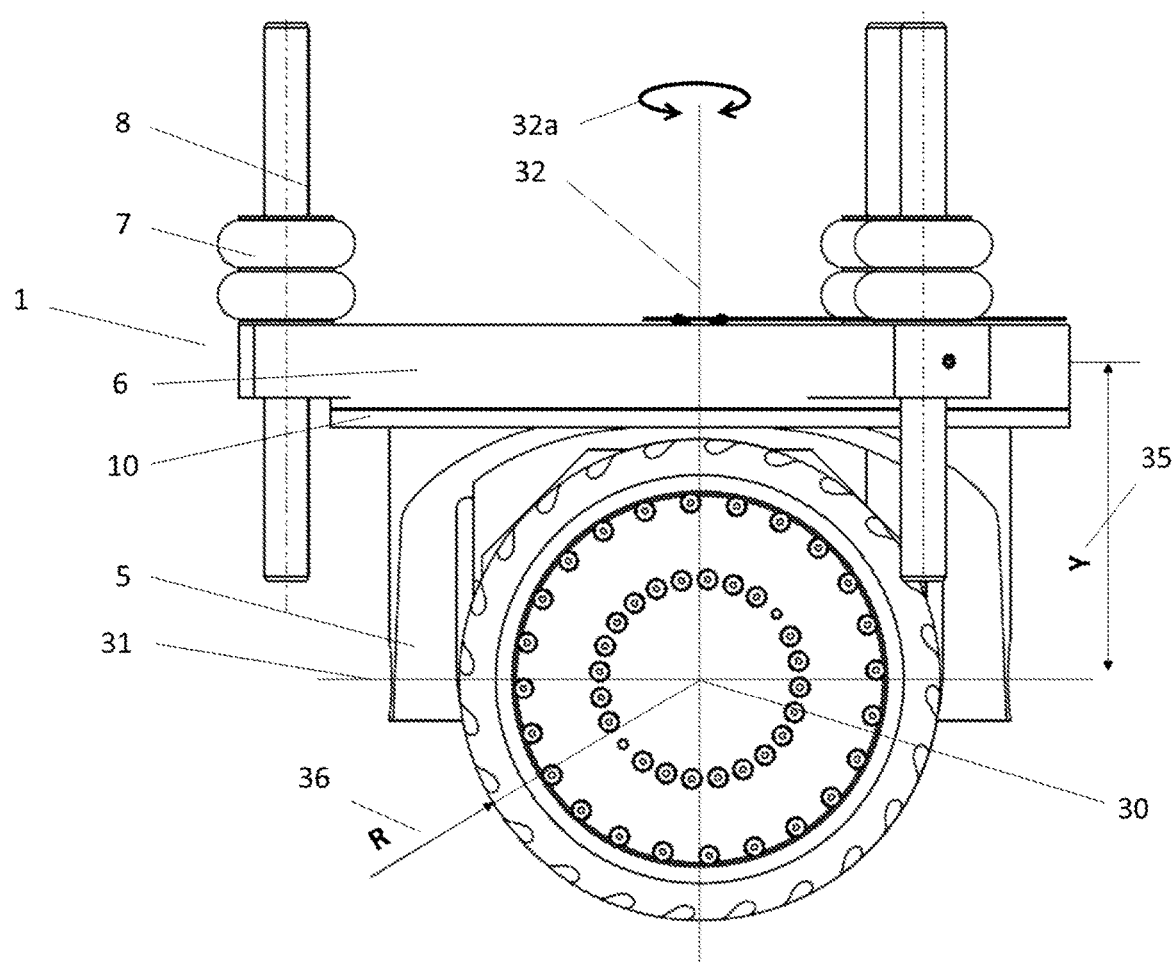
FIG. 2: A side view of the drive system according to the invention.

FIG. 2 shows the drive system 1, with the drive wheels 2, which are dimensioned with the radius R 36, the drive-wheel axis of rotation 30, which intersects 90° the pendulum axis 31, and are vertically spaced with the distance Y 35, from the pivot bearing center.

Figure 3:
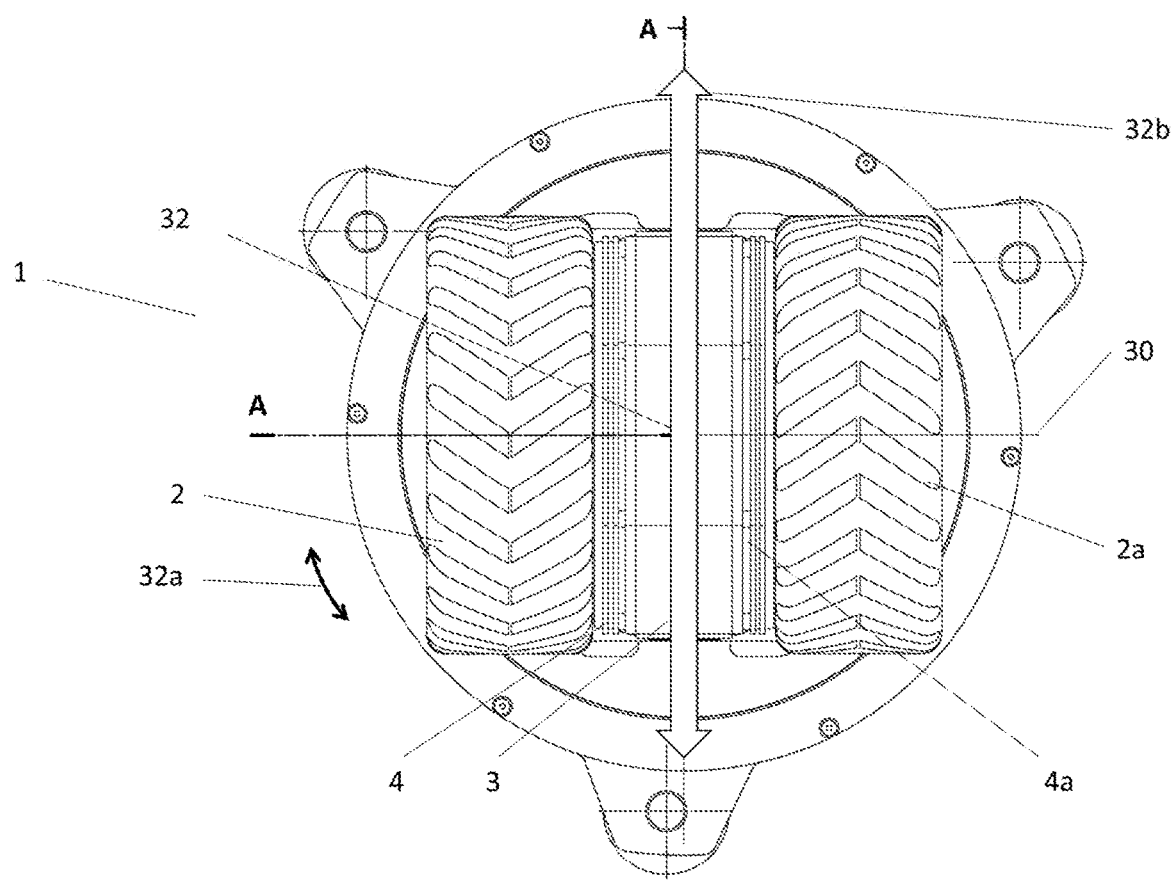
FIG. 3: A bottom view of the drive system according to the invention.

FIG. 3 shows the drive system 1, with the two drive wheels 2 and 2a, the drive-wheel axis of rotation 30, the direction of travel 32b oriented at right angles thereto, the pivot axis 32 with the pivot angle 32a relative to the guide ring 6.

Figure 4:
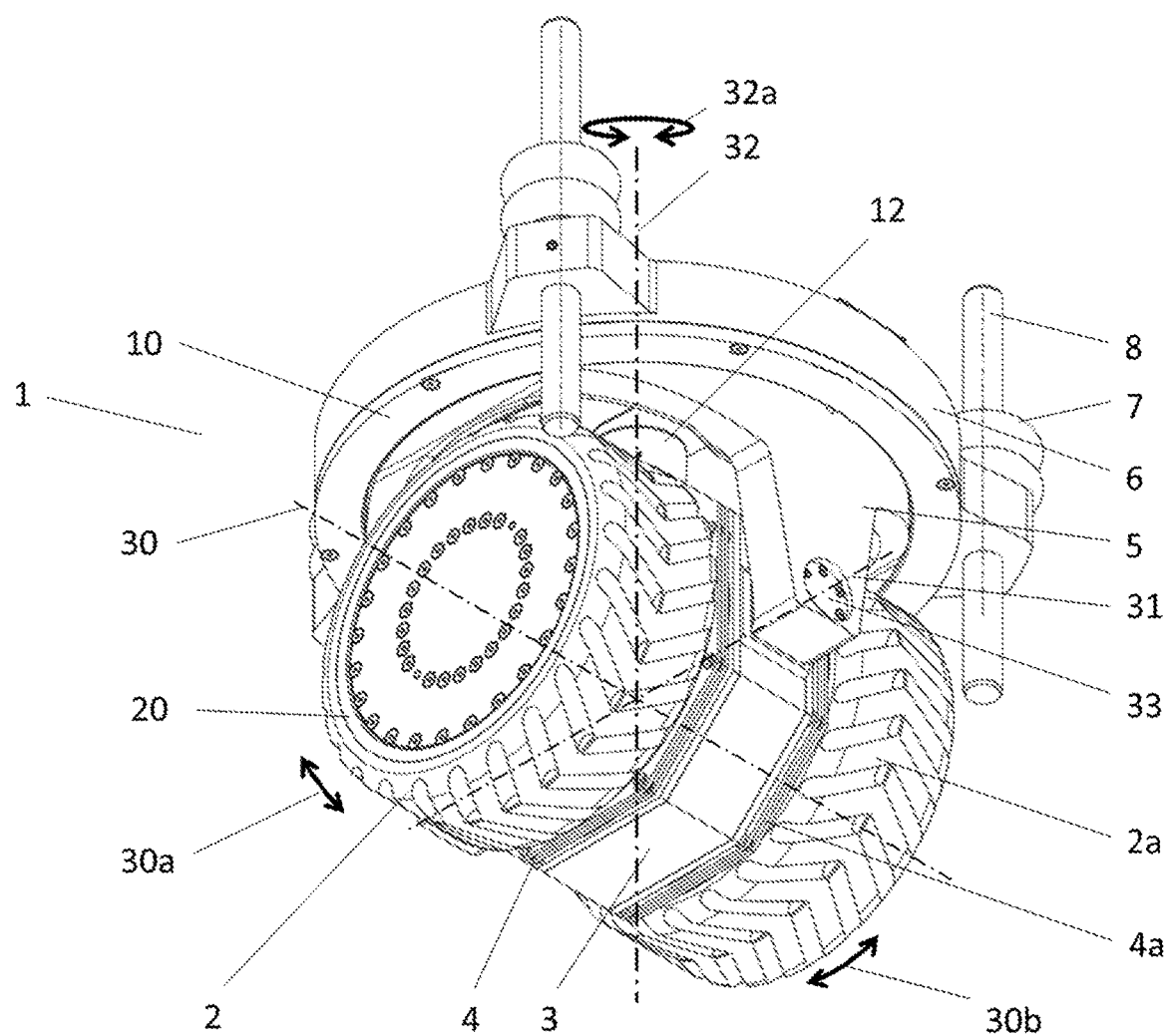
FIG. 4: The drive system according to the invention in oblique view from below.

FIG. 4 shows the drive system 1 and the drive-wheel axis of rotation 30 arranged at an angle of 90° to one another, the pendulum axis 31 and the pivot axis 32, the pivot angle measuring device 12, for detecting the pivot angle relative to the guide ring 6 (or to a vehicle longitudinal axis not shown in more detail and the direction of travel of the entire vehicle which can be determined therefrom), and the pendulum bearing cover 33.

Figure 5:
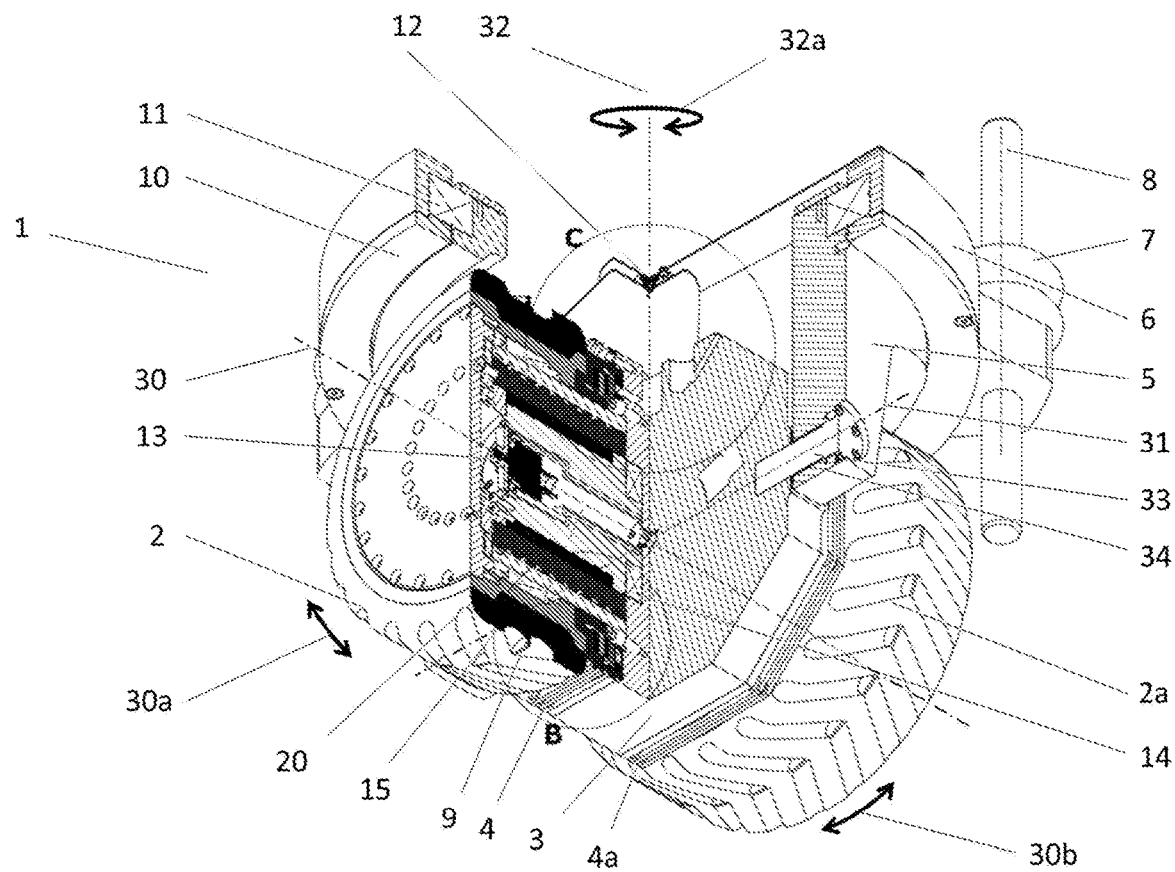
FIG. 5: The drive system according to the invention in oblique view from below and in quarter section according to section line A-A of FIG. 3.

FIG. 5 shows the drive system 1, comprising the pivot bearing 11, the pendulum axis 31 and the pendulum bearing 34, the wheel bearing 15, by means of which the rim 20 is rotatably mounted, the rotational angles 30a and 30b of the drive wheels 2 and 2a, the rotational angle measuring device 13, which is rigidly connected to the wheel carrier 3 by means of a supporting part 9, for detecting the rotational speed and direction of rotation of the drive wheels, and the pivot angle measuring device 12, for detecting the pivot angle relative to the guide ring 6 (or to a vehicle longitudinal axis not shown in greater detail and the direction of travel of the entire vehicle determinable therefrom).

Figure 6:
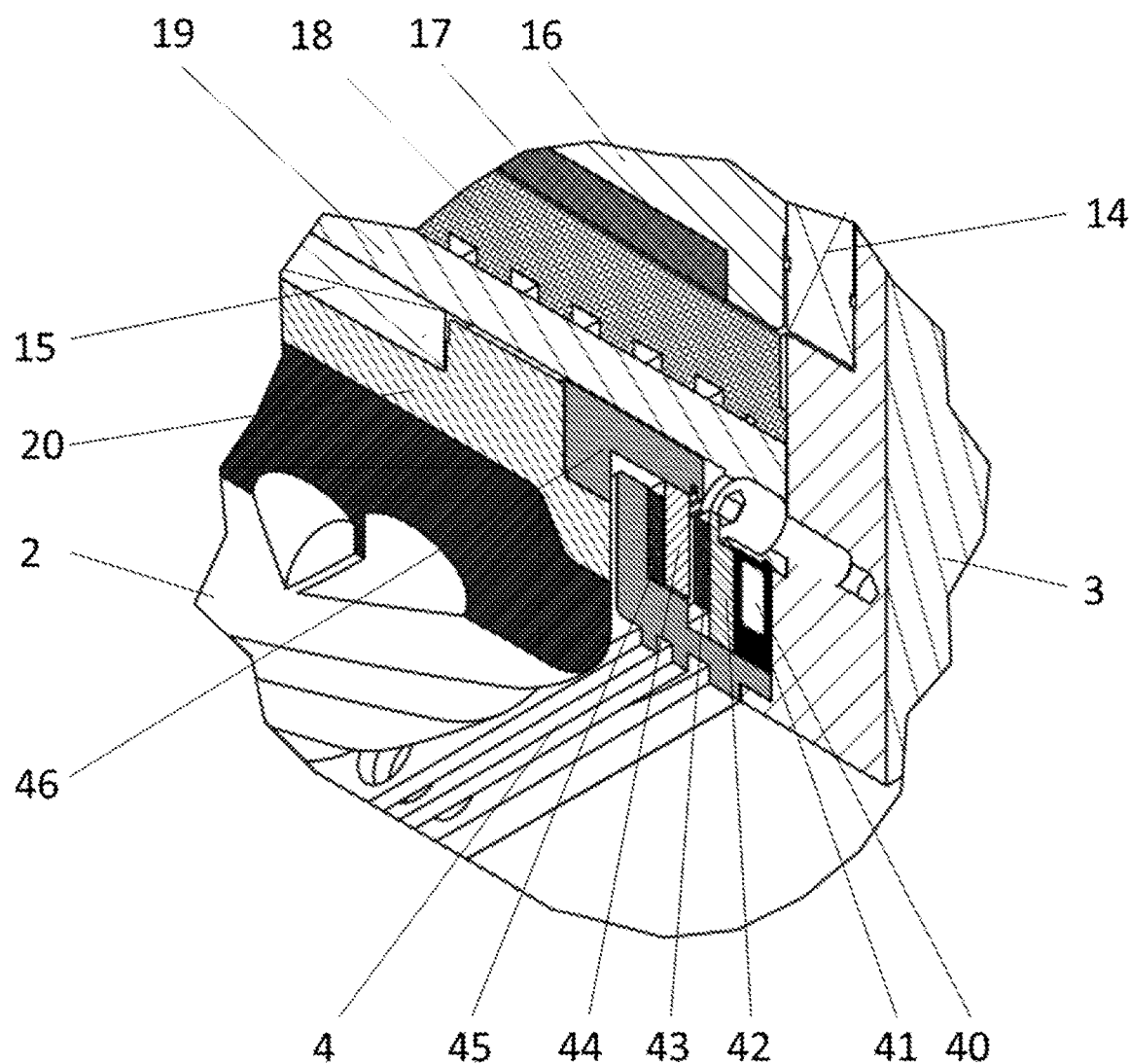
FIG. 6: The detail B of FIG. 5.

FIG. 6 shows the detail B of FIG. 5 with the electromagnetic drive and the braking device, consisting of the wheel carrier 3, to which the rotor bearing 14 is fixed, which rotatably supports the rotor rotation axis 16, wherein the rotor rotation axis 16 is torsionally rigidly connected to the rotor 17, the stator 18 is rigidly connected to the stator sleeve 19 and the stator sleeve 19 is rigidly connected to the wheel carrier 3, the rim 20 is rotatably mounted with the wheel bearing 15 on the stator sleeve 19. The braking device 4 is rigidly connected to the wheel carrier 3 and comprises an elastic annular piston 41 having a cavity 40 which is filled with a fluid and, when pressurized, expands the piston 41 axially so that the brake pressure plate 42, on which a brake pad 43 is applied, is pressed against the brake disk 44 and the latter against the brake pad 45. The brake disk 44 is axially displaceable, but is mounted in a torque-resistant manner on the brake sleeve 46, which is connected to the rim 20 in a torque-resistant manner. In a depressurized condition, the resilient annular piston contracts and the brake is vented.

Figure 7:
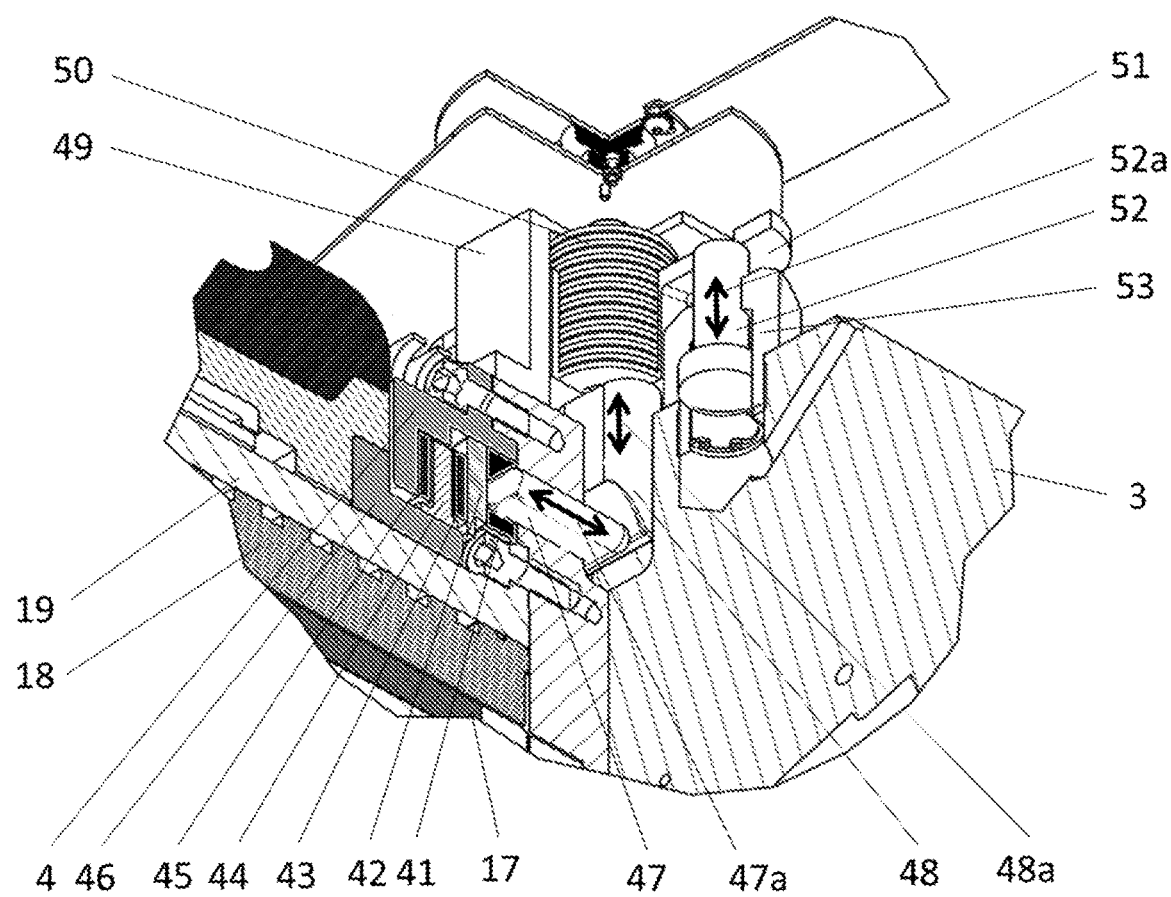
FIG. 7: The detail C of FIG. 5.

FIG. 7 shows the detail C of FIG. 5 with the electromagnetic drive 17, 18 and the braking device 4, consisting of the wheel carrier 3 in which a mechanical braking force device is integrated. This consists of the brake plunger 47 with the direction of movement 47a, the brake wedge 48 with the direction of movement 48a, the brake spring housing 49, the brake spring 50, the brake spring force neutralizer lever 51, the brake spring force neutralizer piston 52 with the direction of movement 52a, and the brake spring force neutralizer cylinder 50. The annular piston 41 is recessed in the region of the brake plunger 47, and a brake pressure force is applied to the brake pressure plate 42 at this point by means of the brake plunger 47. The brake plunger 47 is acted upon by a spring force generated by the pretensioned brake spring 50 and transmitted by means of a brake wedge 48. The spring force generated by the brake spring 50 is neutralized during driving operation by means of the brake spring force neutralizer, consisting of the brake spring force neutralizer lever 51, the brake spring force neutralizer piston 52 acted upon by means of pressure medium, which is located in the brake spring force neutralizer cylinder 53. In the event of system failure or planned shutdown, the brake plunger 47 is pressed against the brake pressure plate 42 by means of spring force, so that a braking effect is produced which prevents unintentional driving movement. Alternatively, instead of the brake spring force neutralizer piston 52 and cylinder 53 being acted upon by a pressure medium, an electromagnetic linear actuator is provided. Preferably, as in FIG. 7, it is provided that the brake spring 50 is at an angle to the brake plunger 47. Preferably, the brake plunger 47 is pretensioned via a link guide, the brake spring 50 and the brake plunger 47 are thus connected to each other via a link guide. In the case shown, a brake wedge 48 having an inclined surface is provided, wherein the inclined surface abuts one end of the brake plunger 47 and is able to push the latter back and forth. Preferably, the brake spring 50 is a coil spring or a disk spring assembly.

The brake spring neutralizer piston 52 is preferably arranged parallel to the brake spring 50, and particularly preferably the brake spring neutralizer piston 52 and the brake spring 50 are at the same level. This enables a particularly space-saving and compact structure. In order to allow the brake spring neutralizer piston 52 to build up force in opposition to the brake spring 50, one end of the brake spring, preferably the end facing the brake plunger 47, may be connected to a movable part of the brake spring neutralizer piston 52, preferably the end of the brake spring neutralizer piston 52 facing away from the brake plunger 47, via a brake spring force neutralizer lever 51. In this way, the transmission of force can be achieved to despite the spatial distribution of the components being as compact as possible.

The drive system 1 according to the invention consists of two individually driven drive wheels 2 and 2a, each coupled to an electromagnetic drive consisting of a rotor 17 and a stator 18, and wherein the rotor 17 is rotatably connected to the wheel carrier 3 on a rotor rotation axis 16 by means of the rotor rotation bearing 14, while the stator 18 is rigidly connected to the wheel carrier 3 by means of the stator sleeve 19. The wheel carrier 3 has a pendulum axis 31 which is oriented 90° to the drive-wheel axis of rotation 30. The pivot axis 32 is aligned perpendicularly to these two axes 30 and 31, which defines the direction of travel 32b of the drive system 1. If both drive wheels 2 and 2a are driven at the same speed and in the same direction of rotation, then the drive system 1 moves in a straight line; if the speeds of the drive wheels 2 and 2a are identical but the directions of rotation are opposite, then the drive system rotates about the vertical pivot axis 32; if the speeds of the drive wheels 2 and 2a are different, then the drive system performs cornering. Ground unevenness is compensated by means of the pendulum axis 31 and both drive wheels 2 and 2a have the same ground contact pressure.

The rims 20 of the drive wheels 2 and 2a are mounted directly with the wheel bearing 15 on the stator sleeve 19, and in this case the stator sleeve 19 has a very large diameter in relation to the prior art (approx. 10 times the diameter of a hub bearing), so that the drive wheel can absorb much higher loads (approx. 5-10 times greater than with hub bearings) and the forces and torques generated in the process are not transmitted to the electromagnetic drive components rotor 17 and stator 18. The electromagnetic drive components rotor 17 and stator 18 and the wheel bearings 20 as well as the rotor rotation axis 16 and the stator sleeve 19 are integrated within the rim volume, so that very compact dimensions are achieved together with a high load capacity.

In a particularly preferred embodiment variant, the two drive wheels 2 and 2a are each coupled to their own braking device 4, which produces reliable locking of the drive wheels when the system is at a standstill or in the event of a system failure, which produces a reliable additional braking effect when required, in the event that the braking effect of the electromagnetic drive system is insufficient, and which has a complete force release of the brake disk 44 in the normal state, so that no braking torques are transmitted to the drive wheels by the braking device in the normal state.

In another preferred embodiment variant, the drive system 1 is designed with a vertical guide 8 and a spring damping system 7 that absorbs vertical shocks.

LIST OF REFERENCE SIGNS

1 Drive system
2, 2a Drive wheels
3 Wheel carrier
4, 4a Braking device, housing of the braking device
5 Rotary pivot part
6 Guide ring
7 Spring damping element
8 Vertical guide
9 Supporting part
10 Pivot bearing cover
11 Pivot bearing
12 Pivot angle measuring device
13 Rotational angle measuring device
14 Rotor bearing
15 Wheel bearing
16 Rotor rotation axis
17 Rotor
18 Stator
19 Stator sleeve
20 Rim
30 Drive-wheel axis of rotation
30a, 30b Rotational angle
31 Pendulum axis
31a Pendulum angle
3 2 Pivot axis
32a Pivot angle
32b Direction of travel of the drive system
33 Pendulum bearing cover
34 Pendulum bearing
35 Distance Y
36 Drive wheel radius R
40 Cavity
41 Piston
42 Brake pressure plate
43 Brake pad
44 Brake disk
45 Brake pad
46 Brake sleeve
47 Brake plunger
47a Direction of movement of the brake plunger
48 Brake wedge
48a Direction of movement of the brake wedge
49 Brake spring housing
50 Brake spring
51 Brake spring force neutralizer lever
52 Brake spring force neutralizer piston
52a Direction of movement of the brake spring force neutralizer piston
53 Brake spring force neutralizer cylinder

The invention claimed is:

1. Drive system for transport devices comprising:
at least two drive wheels aligned on a common first axis, the drive-wheel axis of rotation, which is angled relative to a second axis, the pendulum axis, and a third axis, the pivot axis, is likewise arranged at an angle relative to the first and second axes;
at least one wheel bearing;
at least one rim of at least one of the drive wheels is mounted by means of the at least one wheel bearing;
at least one drive of at least one of the drive wheels is arranged within the wheel bearing; and
at least one braking device coupled to at least one of the drive wheels, in that the at least one braking device is a disk brake, the at least one braking device including a first brake pad, a brake disk, a second brake pad, and a brake cylinder with a cavity configured and arranged to receive a brake medium pressure and whose volume can thereby be varied, and in that at least the first brake pad is configured and arranged to be moved as a function of the volume of the brake cylinder.

2. The drive system of claim 1, characterized in that the at least one rim is rotatably mounted with respect to a stator sleeve via the wheel bearing, and the stator sleeve is configured and arranged to absorb the load forces acting on the drive wheel.

3. The drive system of claim 2, characterized in that the stator sleeve is rigidly connected to a wheel carrier or forms a unit with the wheel carrier.

4. The drive system of claim 1, further including at least one rotor bearing, a wheel carrier, and a rotor, where the rotor supported relative to the wheel carrier via the least one rotor bearing.

5. The drive system of claim 4, characterized in that the at least one wheel bearing is a radial bearing and the rotor bearing is an axial bearing or an combined axial/radial bearing.

6. The drive system of claim 1, further including a rotational angle measuring device configured and arranged to measure the rotational speed and the direction of rotation of the drive wheels, and a control system configured and arranged to process the measured rotational speed and direct of rotation of the drive wheels.

7. The drive system of claim 1, further including a pivot angle measuring device configured and arranged to measure the direction of travel of the drive unit, and a control system configured and arranged to process the measured direction of travel.

8. The drive system of claim 1, further including a plurality of brake sleeves each coupled to a respective drive wheel, each brake sleeve configured and arranged to transmit the braking torque to the respective drive wheel.

9. The drive system of claim 1, characterized in that the at least one braking device is configured and arranged to receive a control input for controlled braking of the drive system, and
further including a rotation angle measuring device configured and arranged to detect rotational movement of the drive wheels, and a pivot angle measuring device configured and arranged to detect the direction of travel of the drive system.

10. The drive system of claim 1, characterized in that the at least one braking device includes at least one brake plunger and at least one brake spring, the at least one brake spring is configured and arranged to pretension the at least one brake plunger in a closed position in which the brake locks at least one drive wheel.

11. The drive system of claim 10, characterized in that the at least one braking device is configured and arranged to generate a braking torque and locks the drive wheels during standstill or system failure.

12. The drive system of claim 10, characterized in that the brake cylinder has a recess through which the at least one brake plunger extends.

13. The drive system of claim 1, characterized in that the brake cylinder is annular and extends around the drive-wheel axis of rotation.

14. The drive system of claim 1, characterized in that the braking device is configured and arranged such that it does not generate any braking torque during driving operation and the release of the braking force is effected hydraulically, pneumatically or electromagnetically.

15. The drive system of claim 1, characterized in that the drive-wheel axis of rotation and the pendulum axis lie in a common plane.

16. The drive system of claim 1, characterized in that the drive-wheel axis of rotation and the pendulum axis are vertically spaced from the pivot bearing at a distance Y, and the distance is between 0 and a maximum value.

17. The drive system of claim 16, wherein the maximum value corresponds to the radius R of the drive wheels.

18. The drive system of claim 1, further including a spring damping element and a vertical guide configured and arranged for reducing shock-like loads.

19. The drive system of claim 1, wherein the at least two drive wheels are configured and arranged to be individually driven.

\* \* \* \* \*